US010113761B2

(12) United States Patent
Munn et al.

(10) Patent No.: US 10,113,761 B2
(45) Date of Patent: *Oct. 30, 2018

(54) HYBRID VENTILATOR

(71) Applicant: CSR BUILDING PRODUCTS LIMITED, North Ryde, NSW (AU)

(72) Inventors: Derek Lawrence Alan Munn, Roseville Chase (AU); Tarek Alfakhrany, Melrose Park (AU)

(73) Assignee: CSR Building Products Limited, North Ryde, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,647

(22) Filed: Feb. 13, 2017

(65) Prior Publication Data

US 2017/0153030 A1     Jun. 1, 2017

Related U.S. Application Data

(63) Continuation of application No. 11/663,711, filed as application No. PCT/AU2005/001471 on Sep. 23, 2005, now Pat. No. 9,599,358.

(30) Foreign Application Priority Data

Sep. 23, 2014   (AU) ............................... 2004905516

(51) Int. Cl.
  *F23L 17/00*   (2006.01)
  *F24F 7/02*    (2006.01)
  (Continued)

(52) U.S. Cl.
  CPC ............ *F24F 7/025* (2013.01); *B60H 1/248* (2013.01); *F03D 3/005* (2013.01); *F04D 25/04* (2013.01);
  (Continued)

(58) Field of Classification Search
  None
  See application file for complete search history.

(56) References Cited

U.S. PATENT DOCUMENTS 1,738,526 A   12/1929  Diebel
1,965,171 A    7/1934  Boyer
(Continued)

FOREIGN PATENT DOCUMENTS

DE     4444757       6/1996
EP     0856708 A2    8/1998
(Continued)

OTHER PUBLICATIONS

Merriam-webster definition of align, from www.merriam-webster.com, "align definition.pdf" attached.*
(Continued)

*Primary Examiner* — Avinash Savani
*Assistant Examiner* — Martha Becton
(74) *Attorney, Agent, or Firm* — Neifeld IP Law, PC (57) ABSTRACT

A ventilator (10) comprises a ventilator stator (12) for mounting to a structure and a ventilator rotor (14) for mounting and rotation with respect to the stator. One or more wind-drivable elements (44) are mounted to the ventilator rotor. A motor (20) is provided for operation between the ventilator rotor and ventilator stator for selective motor-driven rotation of the ventilator rotor.

17 Claims, 4 Drawing Sheets

(51) Int. Cl.

| | | |
|---|---|---|
| *F24F 7/06* | (2006.01) | |
| *F04D 25/06* | (2006.01) | |
| *F03D 3/00* | (2006.01) | |
| *F04D 25/04* | (2006.01) | |
| *F04D 25/08* | (2006.01) | |
| *F24F 7/013* | (2006.01) | |
| *B60H 1/24* | (2006.01) | |
| *F04D 29/28* | (2006.01) | |
| *F24F 11/30* | (2018.01) | |
| *F24F 11/77* | (2018.01) | |
| *F24F 110/10* | (2018.01) | |
| *F24F 110/12* | (2018.01) | |
| *F24F 110/20* | (2018.01) | |
| *F24F 110/32* | (2018.01) | |

(52) U.S. Cl.
CPC ........... *F04D 25/06* (2013.01); *F04D 25/062* (2013.01); *F04D 25/064* (2013.01); *F04D 25/0646* (2013.01); *F04D 25/08* (2013.01); *F04D 29/282* (2013.01); *F23L 17/005* (2013.01); *F24F 7/013* (2013.01); *F24F 7/06* (2013.01); *F24F 11/30* (2018.01); *F24F 11/77* (2018.01); *F04D 25/0613* (2013.01); *F05B 2240/215* (2013.01); *F05B 2240/217* (2013.01); *F24F 2110/10* (2018.01); *F24F 2110/12* (2018.01); *F24F 2110/20* (2018.01); *F24F 2110/32* (2018.01); *Y02E 10/74* (2013.01)

(56) References Cited

U.S. PATENT DOCUMENTS

| | | | |
|---|---|---|---|
| 1,977,934 A | 10/1934 | Bolton | |
| 2,013,244 A | 9/1935 | La Vergne | |
| 2,171,883 A | 9/1939 | McDerment | |
| 2,469,096 A | 5/1949 | Wilson | |
| 3,202,081 A | 8/1965 | Cook | |
| 3,946,648 A | 3/1976 | Schneider | |
| 4,020,565 A | 5/1977 | Steffen | |
| 4,039,849 A | 8/1977 | Mater et al. | |
| 4,055,113 A | 10/1977 | Monroe | |
| 4,200,035 A | 4/1980 | Zaniewski | |
| 4,303,375 A | 12/1981 | Foglesong | |
| 4,318,019 A | 3/1982 | Teasley et al. | |
| 4,416,415 A | 11/1983 | Kolt | |
| 4,501,389 A | 2/1985 | Kolt | |
| 4,768,424 A | 9/1988 | Frenkler | |
| 4,831,021 A | 5/1989 | Potter | |
| RE33,600 E | 6/1991 | Timmons | |
| 5,251,815 A | 10/1993 | Foye | |
| 5,326,313 A | 7/1994 | Miniat | |
| 5,364,304 A | 11/1994 | Hampton | |
| 5,783,894 A | 7/1998 | Wither | |
| 5,881,951 A | 3/1999 | Carpenter | |
| 6,302,778 B1 | 10/2001 | Andrews | |
| 6,306,030 B1 | 10/2001 | Wilson | |
| 6,352,473 B1 | 3/2002 | Clark | |
| 6,582,291 B2 | 6/2003 | Clark | |
| 6,814,661 B2 | 11/2004 | Jardinier | |
| 6,849,978 B2 | 2/2005 | Sun | |
| 2004/0097184 A1 | 5/2004 | Munn | |
| 2008/0000630 A1 | 1/2008 | Haglid | |

FOREIGN PATENT DOCUMENTS

| | | |
|---|---|---|
| GB | 1602998 | 11/1981 |
| GB | 2165938 | 4/1986 |
| GB | 2213926 | 8/1989 |
| RU | 2066428 | 9/1996 |

OTHER PUBLICATIONS

Derwent Abstract Assession No. 98-597869/5 1Class Q43, Q74 and JP 10267346.

Mar. 30, 2006, International Search Report for International Application No. PCT/AU2005/001471.

Apr. 13, 2011, Supplementary European Search Report issued in 05787052.9

Mar. 23, 2007, Written Opinion of the International Search Authority for International Application No. PCT/AU2005/001471.

Mar. 23, 2007, International Preliminary Report on Patentability Chapter II for International Application No. PCT/AU2005/001471.

* cited by examiner

HYBRID VENTILATOR

CROSS REFERENCE TO RELATED APPLICATIONS

This application is a continuation of application Ser. No. 11/663,711, filed Nov. 9, 2007, which is a National Stage Entry of PCT/AU05/01471, filed Sep. 23, 2005, which claims priority to AU 2004905516, filed Sep. 23, 2004, all of which are incorporated herein by reference.

TECHNICAL FIELD

A ventilator is disclosed that is a hybrid of a wind driven ventilator and a motor driven ventilator.

BACKGROUND ART

Ventilators can be employed to evacuate air and other gases from enclosed spaces. Such enclosed spaces can include the roof space or interior of commercial and domestic buildings, shipping containers, portable buildings and sheds, automobiles etc. The air and other gases evacuated can include warm or heated gases, moist gases, gas containing contaminants such as contaminated air or toxic fumes, stale gases (especially air) etc.

A ventilator known as a rotor ventilator comprises a rotor having a plurality of vanes which are oriented in use to capture ambient wind to drive (rotate) the ventilator rotor. In use, when the ventilator rotor is wind driven, air adjacent to the vanes is forced outwardly by the rotating vanes, and this air is in turn replaced by air from the enclosed space. This causes, in effect, a pumping out of air from the space.

SUMMARY

In one aspect there is provided a ventilator comprising:
a ventilator stator for mounting to a structure;
a ventilator rotor for mounting and rotation with respect to the ventilator stator, the rotor comprising one or more wind-drivable elements; and
a motor for operation between the ventilator rotor and ventilator stator for selective motor-driven rotation of the ventilator rotor.

The motor enables the ventilator rotor to be selectively driven, for example, in low wind conditions and/or in excessive (eg. overly hot, moist or contaminated) enclosed space conditions.

Reference herein to "wind-drivable elements" does not exclude the ventilator rotor being rotated by means other than the wind or the motor. For example, the ventilator rotor may be driven by thermally generated gas currents exiting the enclosed space via the ventilator, or as a result of other gas pressurising means operating within the enclosed space (eg. conditioned or heat-induced airflow). Also, "wind-drivable" means the element can be driven by the wind.

The wind drivable element is typically a vane or a blade, but may comprise another wind catchment device such as a cup, sail-shape etc.

Typically the rotor is oriented such that one or more of the wind-drivable elements is/are substantially exposed to the wind in use. More typically each element is arranged in use to be substantially exposed to the wind. Thus, the ventilator rotor may function in a normal wind-driven manner to receive a maximum prevailing wind force.

Whilst typically a motor may be mounted for operation between the rotor and stator, the motor may itself define the rotor and/or the stator of the ventilator. In this regard, and in the case of an electric motor, motor magnets may be eg. incorporated into the ventilator rotor and/or coils into the ventilator stator. In other words the motor may be integrated into the actual structure of the ventilator.

In one embodiment the motor connects the ventilator rotor to the ventilator stator. In this regard, the motor rotor may be connected to the ventilator rotor and the motor stator may be connected to the ventilator stator. The motor can then act as a rotating mounting for the ventilator rotor with respect to the ventilator stator. In addition, the motor also functions as a type of bearing for the ventilator rotor.

For example, when the ventilator rotor is caused by eg. the wind to rotate with respect to the ventilator stator, it typically causes the motor rotor to also rotate therewith, and thus rotate with respect to the motor stator.

However, the motor may alternatively be located separately to the ventilator rotor and stator, or may even be located externally of the ventilator. In either case, the motor can drive the ventilator rotor via eg. a gear-train or belt drive etc.

In one form the ventilator stator may comprise a frame for mounting to the structure.

In a first embodiment the motor stator may be directly mounted to the frame. Mounting the motor stator directly to the frame can enhance mechanical, constructional and operational efficiencies. For example, the ventilator can be provided in a more compact form, and the motor can be housed entirely within the ventilator.

In a second alternative embodiment the motor stator can be mounted to a shaft which in turn is mounted to and projects from the frame. The shaft may support the motor stator at a remote end thereof.

In one form the motor rotor can be mounted directly to the ventilator rotor, resulting in the same efficiencies as with direct frame mounting of the motor stator.

Typically the motor is an "external rotor-type motor", in which case the motor comprises a so-called "external rotor". An external rotor is more easily able to be mounted to the ventilator rotor.

In the first embodiment, where the motor rotor and motor stator are each directly mounted to corresponding parts of the ventilator, motor internal bearings are typically provided that primarily absorb axial thrust loads but which can also absorb radial forces to which the ventilator rotor may be subjected in use. Typically the motor internal bearings are selected such that the motor is able to resist twisting or torsional forces applied to the ventilator by eg. variable wind conditions/directions.

In the second embodiment the motor stator can be mounted to a flange located at the shaft remote end. A thrust bearing arrangement may then be provided to primarily absorb axial thrust loads but which can also absorb radial forces to which the ventilator rotor may be subjected in use. The thrust bearing arrangement includes a projection from the motor rotor that is supported for rotation within a recess at the shaft remote end. Typically the projection is a shaft of the motor rotor that is supported in a bush which is in turn supported for rotation within a ball bearing assembly located within the flange recess, with this assembly thereby providing the thrust bearing. The thrust bearing arrangement can generally enhance the bearing function of the motor between the ventilator rotor and stator. Supporting the shaft in this manner can also enable the motor to resist twisting or torsional forces applied to the rotor by eg. variable wind conditions/directions.

Typically an axis of the motor is aligned with a central ventilator rotor axis to provide for a symmetrical and balanced operation of the motor and ventilator in use.

The motor rotor can be connected to a surrounding housing for the motor, with the motor housing in turn being connected to the ventilator rotor.

In one embodiment the housing is a sleeve that is directly mounted to a plate of the rotor, with the motor rotor being received and retained with the sleeve. The sleeve may alternatively be integrally formed with the plate to project therefrom.

In another embodiment, the housing comprises a cap in which the motor rotor is received and retained, with the cap being mounted to the ventilator rotor plate, to connect the motor rotor thereto.

Such arrangements provide a simple means for attaching the motor rotor to the ventilator rotor. The sleeve and cap can each also provide an enclosure for the motor rotor to prevent the ingress thereinto of particulate matter such as dust etc.

In one form the ventilator rotor comprises an in-use top plate, an in-use bottom plate, and a plurality of wind-drivable elements extending between and respectively connected at opposing ends to the top and bottom plates.

The ventilator may further comprise a dome-shaped cover for the rotor. The dome-shaped cover can be mounted to the rotor top plate. The dome-shaped cover can protect the rotor ventilator from environmental conditions/elements, can increase the rigidity of the rotor, can provide an aerodynamic profile to the rotor and can enhance the aesthetics of the rotor.

Typically the motor has low rotational resistance. In this regard the motor may be "free-spinning". Thus, when the motor functions as a bearing in the ventilator (ie. by interconnecting the ventilator rotor and ventilator stator), the provision of low rotational resistance can enhance the motor's function as a bearing and can allow ventilator rotor rotation in a broad range of ambient wind conditions.

The motor can be electrical, being powered by either a direct or alternating current power supply (eg. from a mains source) or can be battery driven. When the power supply is direct current, the motor may be supplied power via one or more solar panels. Alternatively the motor can be air/pneumatically driven, or may comprise an internal combustion engine or gas turbine etc.

A typical structure to which the ventilator stator is mounted is a roof, wall etc of an enclosed space of a building, or portable structure such as a shed, house, automobile etc.

BRIEF DESCRIPTION OF DRAWINGS

Notwithstanding any other forms that may fall within the scope of the ventilator as defined in the Summary, specific embodiments of the ventilator will now be described, by way of example only, with reference to the accompanying drawings in which.

DETAILED DESCRIPTION OF SPECIFIC EMBODIMENTS

Figure 1:
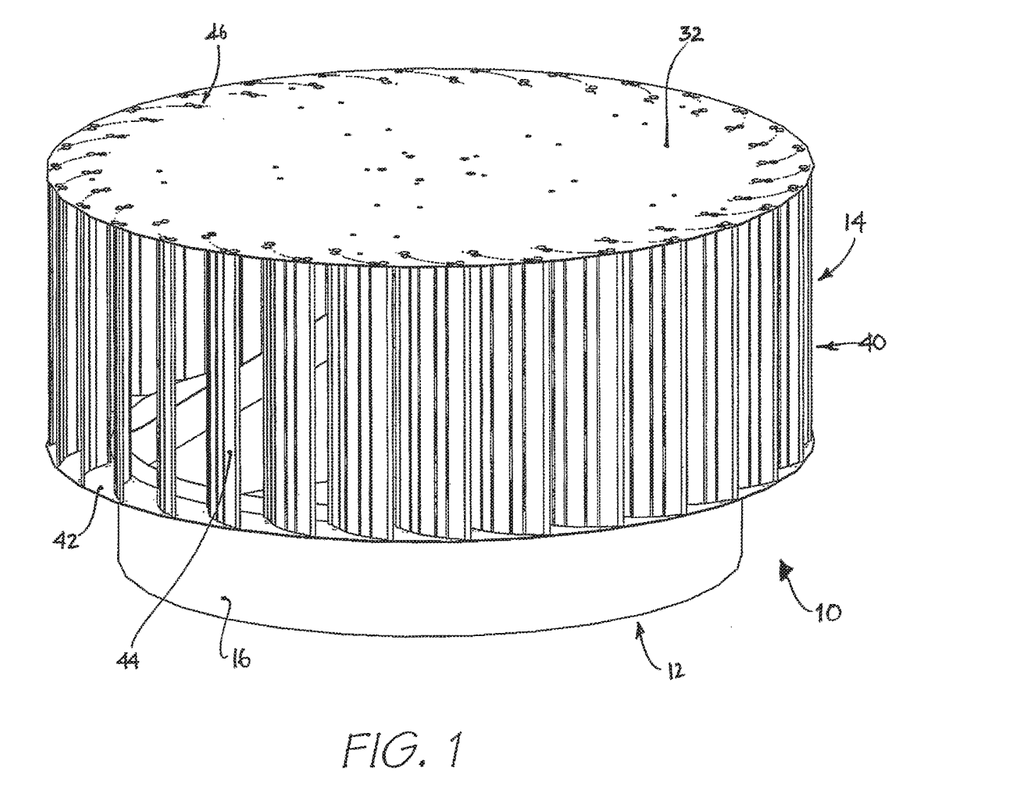
FIG. 1 shows a perspective view of a first hybrid ventilator embodiment with an optional dome-shaped cover removed therefrom.
Figure 5:
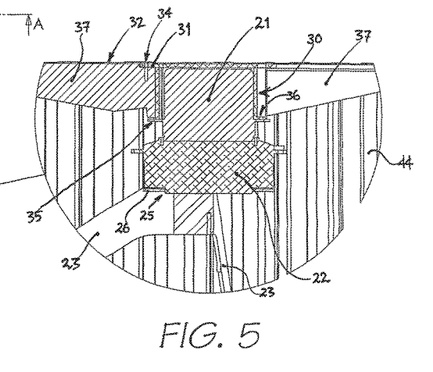
FIG. 5 shows a detail from the sectional view of FIG. 4.

Referring firstly to FIGS. 1 and 5, a first embodiment of a hybrid ventilator 10 is shown. This configuration is typically employed with larger ventilator installations.

The ventilator shown comprises two main bodies, a ventilator stator 12 and a ventilator rotor 14.

The ventilator stator 12 comprises a throat 16 that is circular in cross-section, and a frame in the form of sub-assembly 18 to locate and support a drive motor 20. In the embodiment of the hybrid ventilator depicted in FIGS. 1 to 5, the motor directly connects the ventilator rotor to the ventilator stator. The motor also functions as a bearing between the ventilator rotor and ventilator stator. Typically the motor is of low rotational resistance (eg. a free-spinning-type motor having a rotor that is external to its stator) as described below.

The motor rotor comprises a motor body 21 for mounting to the ventilator rotor. When the motor has an external rotor as shown, the motor body 21 forms an integral part of the motor rotor.

The motor stator comprises a motor base 22 for supporting the motor body 21 for rotation thereon. The motor stator is connected to the ventilator stator 12 to provide for fixing of the ventilator to a flue or other outlet, and a base may be attached to the throat 16 that then adapts the ventilator for mounting to various pitches of roofs, or a wall etc as required.

Figure 2:
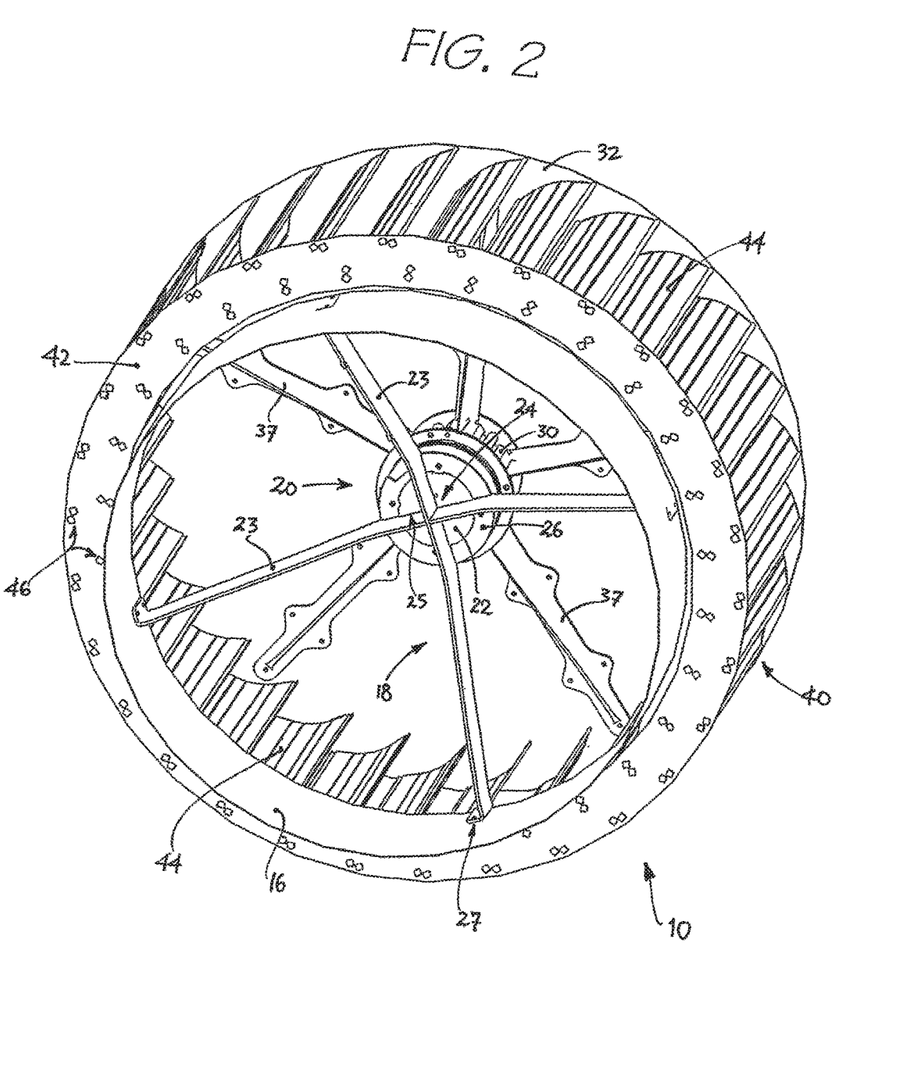
FIG. 2 shows an underside perspective view of the ventilator of FIG. 1, showing a motor located therewithin.
Figure 3:
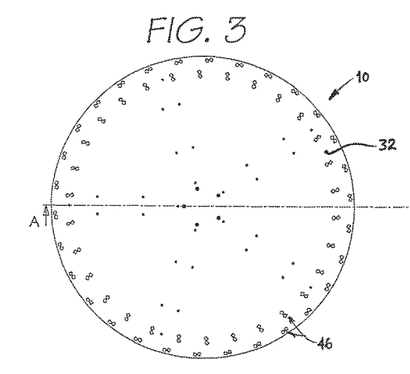
FIG. 3 shows a plan view of the first ventilator embodiment of FIGS. 1 and 2.
Figure 4:
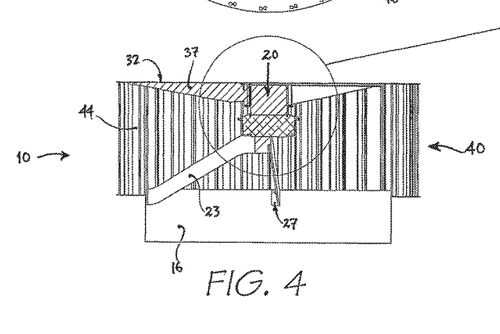
FIG. 4 shows a side sectional view of the ventilator of FIG. 3 taken on the line A-A.

The ventilator stator sub-assembly 18 comprises a number of brackets 23 (eg. four brackets are shown in FIG. 2). The brackets intersect at 24 and are shaped at 25 for supporting receipt of the motor base 22 and a mounting ring 26 affixed to both the base 22 and the brackets. Outer ends of each bracket 23 are connected to the throat 16 via respective rivets 27. Thus, the sub-assembly 18 mounts the motor stator to the ventilator stator 12 and supports the motor in use. In addition, the motor stator is prevented from rotating in use when the motor is activated.

Motor leads from either a direct or alternating current source, such as a mains power supply, battery, transformer, solar panel etc are typically supported on the sub-assembly 18, and run along a given bracket 23 to feed into the motor base 22.

The motor body 21 is mounted to and within a sleeve 30 forming a part of the ventilator rotor. The sleeve 30 is mounted to a circular plate 31, fastened to the underside of a ventilator rotor top plate 32 via fasteners 34. The sleeve 30 may alternatively be integrally formed with the ventilator rotor.

The motor body comprises a peripheral flange 35 projecting out from its sidewall and adjacent to a base of the motor body 21. Flange 35 aligns with corresponding flanges 36 of the sleeve 30 and fasteners are then introduced through the flanges 35, 36 to fasten the motor body (ie. and thus fasten the motor rotor) to the ventilator rotor 14.

For additional stability a number of braces 37 (eg. five braces are shown in FIG. 2) can be provided that extend between the sleeve 30 and an outer periphery of ventilator rotor plate 32, with the braces being fastened (eg. via rivets) to the underside of plate 32. Each brace 37 is sized at a proximal end to snugly locate between the plate 31 and the flanges 36 of sleeve 30 (as best shown in FIG. 5).

Typically the motor 20 employs deep groove ball bearing rows/races internally between the motor rotor and stator. Such bearings can provide a thrust bearing function to absorb primarily axial thrust loads but also radial forces to which the ventilator may be subjected in use. Whilst this arrangement may not be used in some applications or with some ventilator constructions, it is typically employed for larger ventilators with more robust motors.

The deep groove ball bearing assembly can resist/accommodate axial and radial loads to which the ventilator rotor is subjected, and also resist twisting or torsional forces applied to the ventilator rotor eg. by variable wind conditions and directions.

The ventilator rotor comprises a turbine or impeller assembly 40. The assembly 40 comprises the disc-shaped ventilator rotor top plate 32 and an annular-disc-shaped bottom plate 42. A plurality of vanes or blades 44 extend between and are connected at respective ends to the top and bottom plates. In this regard, the vanes or blades are secured to the top and bottom plates 32, 42 by bent over tabs 46 (FIGS. 1 to 3) inserted, through corresponding slots in the plates.

The turbine assembly 40 may further comprise a dome for aesthetic and/or aerodynamic effects, although the installation of FIGS. 1 to 5 as depicted is completely waterproof without the dome. A dome can also act as a protective cover against sun and dust.

In use the motor body 21 rotates on and is supported by motor base 22. As described above, the motor 20 is mechanically connected between and to each of the ventilator stator 12 and ventilator rotor 14 and thus, when activated, can be used to drive (or supplement the drive) of the ventilator rotor 14. At the same time it can function as a rotational bearing for the ventilator rotor 14.

In one mode of use, when evacuating air from an enclosed space, the rotational output of the motor 20 is transferred to the ventilator rotor 14, driving the turbine assembly (impeller) 40 to cause a ventilating (pumping) action. In this regard, air (or other gases) within the enclosed space in relation to which the ventilator 10 is located, is caused to be drawn out of the enclosed space, the air/gas discharging between the vanes/blades 44.

A unique feature of the ventilator 10 is the ability of the turbine assembly 40 to be powered by both ambient wind and/or the motor. In this regard, the vanes/blades 44 each function as a working element in that they can induce a radial flow akin to that achieved from a centrifugal fan. The moving vanes/blades (ie. as a result of ambient wind and/or the motor) cause adjacent air (or gas) molecules to be rotated therewith. As a result of the centrifugal acceleration imparted to the rotating molecules a progressively increasing outwardly directed radial force is imparted to the air molecules. The resultant centrifugal force expels the air molecules radially outwards from the ventilator 10, causing (or inducing) replacement air to be drawn into the throat 16 of the ventilator and then into the voids between the vanes/blades. Thus, when the rotor is moving, a continuous flow of air through the ventilator results.

Figure 6:
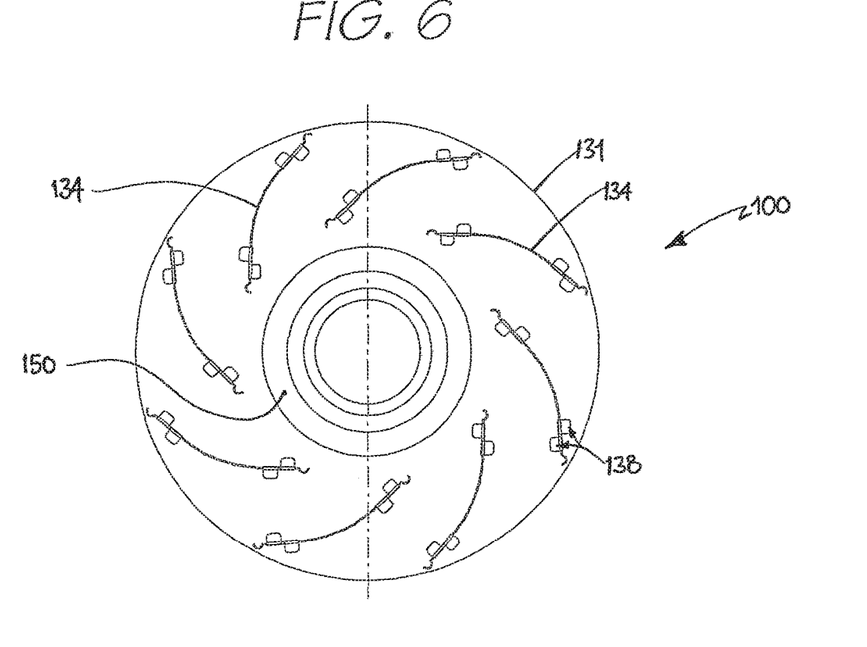
FIG. 6 shows a plan view of a second hybrid ventilator embodiment with a dome-shaped cover removed therefrom.
Figure 7:
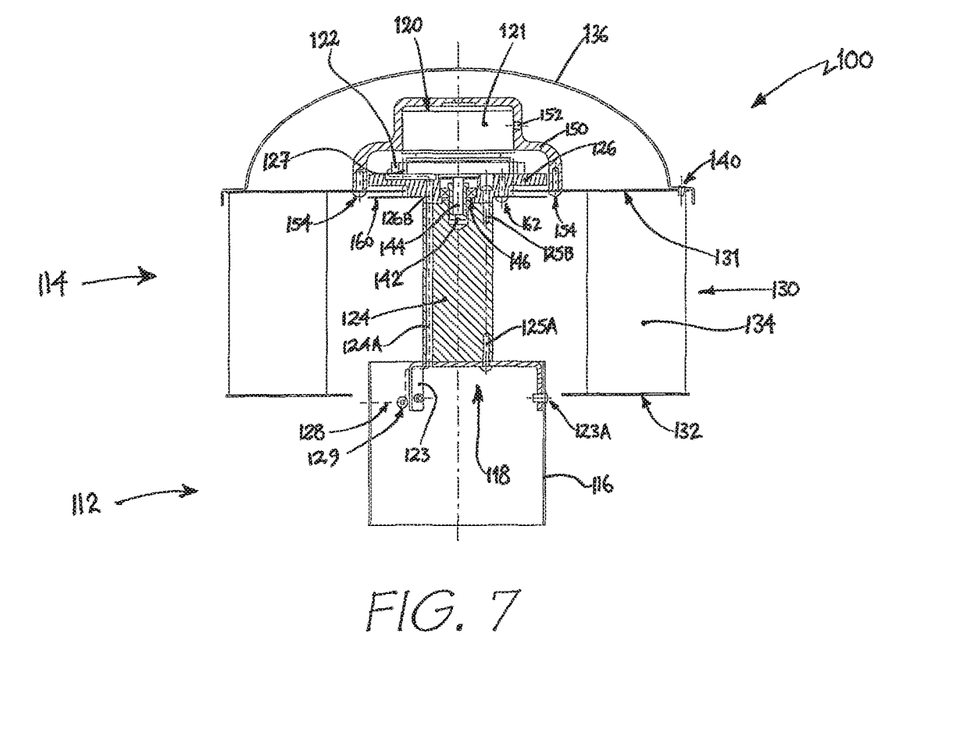
FIG. 7 shows a side sectional elevation of the ventilator of FIG. 6, but with the dome-shaped cover in place.

Referring now to FIGS. 6 and 7, a second embodiment of a hybrid ventilator 100 is shown. This configuration is typically employed with smaller ventilator installations.

Again, the ventilator shown comprises two main bodies, a ventilator stator 112 and a ventilator rotor 114. The stator 112 comprises a throat 116 that is circular in cross-section, and a sub-assembly 118 to locate and support a drive motor 120.

In the embodiment of the hybrid ventilator depicted in FIGS. 6 and 7 the motor connects the ventilator rotor to the ventilator stator via a shaft 124 (as described below). Again the motor is of a low rotational resistance (free-spinning) type.

Again, the motor rotor comprises a motor body 121 and the motor stator comprises a motor base 122 for supporting the motor body for rotation thereon. Again, the stator 112 can be adapted for fixing of the ventilator to a flue, and may also be fitted to a base structure that adapts the ventilator for mounting to a roof, wall etc as required.

The stator sub-assembly 118 comprises a bracket 123, a shaft 124 and a flange 126. The bracket 123 is connected to the throat 116 via rivets 123A. The shaft 124 is in turn connected at one end to the bracket 123 by screws 125A and at an opposite end to the flange 126 by screws 125B. The motor base 121 is secured to the flange 126 by fasteners 127 (eg. Taptite® screws), and is thereby connected through to the throat 116 (stator). Thus, the sub-assembly 118 of bracket 123, shaft 124 and flange 126 mounts the motor 120 to the stator 112 and supports the motor in use in addition, the motor base is prevented from rotating in use when the motor is activated.

Motor leads 128 from either a direct or alternating current source, such as a battery, transformer, solar panel etc pass through an insulating (rubber) grommet 129 in the throat 116, and are also supported on the sub-assembly 118 and lead up to the motor 120 as shown, passing through a passage 124A in shaft 124 and an aperture 126A in the flange 126.

A turbine/impeller assembly 130 of the ventilator 100 comprises top and bottom plates 131,132, with a plurality of vanes or blades 134 extending between and connected to the top and bottom plates. In this regard, the vanes are secured to the top and bottom plates 130,132 by bent over vane tabs 138 (FIG. 1).

The turbine assembly 130 further comprises a dome 136. The dome 136 is secured to the top plate 131 by either rivets 140 or by a series of cold-formed type joints. The dome 136 acts as a protective cover for the rotor ventilator to protect it against environmental conditions/elements (rain, sun etc), and also functions as a structural element to increase the rigidity of the top plate 131. It also provides an aerodynamic profile to the ventilator.

In addition to the mounting of the motor base 122 to the flange 126, the mounting of the motor body 121 to the shaft 124 can employ a thrust bearing arrangement to primarily absorb axial thrust loads but also radial forces to which the ventilator rotor may be subjected in use. Whilst this arrangement may not be required in some applications or motor constructions, it can be employed for smaller or less robust motor types.

The thrust bearing arrangement includes a bush 142 that is located for rotation within a recess in the end of shaft 124 as shown. The bush 142 is fastened to a motor shaft 144 projecting centrally out from the motor body 121. The bush 142 is also mounted within a ball bearing assembly 146, housed within the flange 126.

The ball bearing assembly functions as a thrust bearing. Thus, when the motor is activated, the ball bearing assembly 146 supports therewithin the rotation of the bush 142 and motor shaft 144, and resists/accommodates any axial and radial loads to which the rotor is subjected. The bearing of motor shaft 144 also enables the motor to resist twisting or torsional forces applied to the rotor eg. by variable wind conditions and directions.

When the motor body 121 rotates on the motor base 122, the motor shaft 144 connected to the motor body 121 rotates within and is supported by bearing 146.

To mount the motor body 121 to the rotor 114, a cap 150 is connected to the motor body via set screws 152. A lower edge of cap 150 is then fastened to the top plate 131 via a series of screws 154.

To shield the motor and bearing assembly against the ingress of airborne particulate matter (eg. dust, moisture, fluids etc), and to prevent the drop out of motor and bearing assembly lubricants, a shielding plate 160 can be mounted to the flange 126 as shown, via a series of screws 162.

The motor 120 can thus be used to drive (or supplement the drive) of the ventilator rotor 114.

The ventilator embodiment of FIGS. 6 and 7 may have similar modes of use to the ventilator embodiment of FIGS. 1 to 5.

Activation of the motor 20, 120 may be controlled by a microprocessor-based control system, which can receive as inputs eg. ambient temperature, enclosed space temperature, humidity, ambient wind velocity etc, or can be pre-programmed. Thus, the motor can be selectively activated (eg. in low wind conditions on a hot day).

In contrast to powered fans, which are always enclosed in some form of cowling, the ventilator 10, 100 exposes the impeller (and more particularly the vanes/blades) to any ambient wind conditions and can make use of such conditions to achieve a ventilation effect. As best shown in FIGS. 1 and 7, the vanes are oriented so as to be substantially exposed to the wind in use (ie. they are arranged to receive a maximum component of prevailing wind when the wind (airflow) generally laterally impinges on the rotor ventilator). In this regard, the vanes are not shrouded by a cowling or the like and can function in a normal wind-driven manner.

The vanes/blades may be impelled by other than ambient wind or the motor. For example, the ventilator rotor may be driven by thermally generated gas currents exiting an enclosed space in relation to which the rotor ventilator is located, or by other gas pressurising means (eg. conditioned or heated airflow) operating within the enclosed space. In this regard, the ventilator can function as a controlled/controllable gas escape valve.

Whilst in the embodiments of FIGS. 1 to 7 the motor is shown connecting the ventilator rotor to the ventilator stator, the motor may also be located separately to the ventilator rotor/stator mounting. In this case, a separate bearing between the ventilator rotor and ventilator stator is employed. Then, the motor may be located within the ventilator and be connected by gear, belt drive etc to the ventilator rotor.

As a further alternative, the motor may be located externally of the ventilator and be gear or otherwise connected to the rotor (eg. via a drive belt or chain). In yet another alternative, the motor may be mounted at or below the throat 16, 116 and connected to drive (rotate) the ventilator rotor through a suitable transmission arrangement (eg. gearing).

In a further variation, a one-way over-running clutch may be employed as part of a transmission arrangement between the motor and ventilator rotor to further reduce any motor resistance to ventilator rotor rotation, for example, when ambient wind conditions and/or thermal currents are the only power source.

The direct current source for the motor may employ voltages ranging from 5 to 100 volts (eg. 12, 24, 48 volt batteries etc). The alternating current source may employ voltages ranging from 100 to 415 volts (eg. 110 or 240 volt mains power supply) and may employ single phase or three phase power supply. Use of direct current enables batteries and solar panels to provide power to the motor, whereas use of alternating current enables a mains or grid electricity supply to provide power to the motor.

Instead of electrical power, the motor may be air/pneumatically or even steam driven, or may comprise an internal combustion engine or gas turbine etc.

Components of the ventilator may be able to be retrofitted to known ventilators that comprise a top plate and wind driveable vanes or blades extending therefrom, although typically each hybrid ventilator is purpose designed and manufactured.

An external faring may also be provided at the ventilator rotor bottom plate to enhance the aerodynamic profile of the ventilator.

Whilst the motor is typically a low rotational resistance (free-spinning) type, it may have relatively high torque output, especially for larger ventilator installations. The motor may have a torque in the range of 1-2 Nm. In this regard, the motor may have a high torque to rpm ratio, with a larger ventilator installation operating at speeds in the range of 200-400 rpm, and smaller ventilator installations operating at speeds in the range of 600-800 rpm.

In a further variation the motor may be integrated into the actual structure of the ventilator. In this regard, the motor may itself be constructed and shaped to define the ventilator rotor and/or the ventilator stator. In the case of an electric motor, motor magnets may be incorporated into the ventilator rotor and/or coils into the ventilator stator.

Whilst specific embodiments of the rotor ventilator have been described, it should be appreciated that the rotor ventilator can be embodied in many other forms.

The invention claimed is:

1. A wind- or motor-driven ventilator having a rotational axis, comprising:
   a ventilator stator that is able to be mounted to a structure,
   a ventilator rotor that is mounted to rotate with respect to the ventilator stator on the rotational axis when the ventilator rotor is caused to rotate by the wind, the ventilator rotor having one or more wind-drivable elements that are arranged so as to be substantially and directly exposed to the wind around a circumference of the rotor when in use,
   a clutchless external rotor motor having an axis that is co-linear with the ventilator rotational axis, the external rotor motor comprising:
      an external rotor that is mounted with respect to the ventilator rotor to be at least partially within the ventilator, and
      a stator that is mounted with respect to the ventilator stator,
   such that, when the motor is activated, the external rotor is caused to rotate, which causes the ventilator rotor to rotate with respect to the ventilator stator.

2. A wind-driven ventilator as claimed in claim 1 wherein the motor is configured to act as an axial and thrust bearing for the ventilator rotor.

3. A wind-driven ventilator as claimed in claim 1 wherein the motor has a low rotational resistance.

4. A wind-driven ventilator as claimed in claim 1 wherein the structure to which the ventilator stator is mounted is the roof of an enclosed space of a building, or a portable structure including a shed, house or automobile.

5. A wind-driven ventilator as claimed in claim 1 wherein the one or more wind-drivable elements comprise one or more vanes or blades that is/are substantially exposed to the wind when in use.

6. A wind-driven ventilator as, claimed in claim 5 wherein the ventilator rotor comprises an in-use top plate, an in-use bottom plate, and wherein each wind-drivable vane or blade extends between and is connected at respective opposing ends to the top and bottom plates.

7. A wind-driven ventilator as claimed in claim 1 wherein the ventilator stator comprises a frame for mounting to the structure.

8. A wind-driven ventilator as claimed in claim 7 wherein the frame further comprises one or more brackets that are each arranged to directly or indirectly support the motor stator.

9. A wind- or motor-driven ventilator having a rotational axis, comprising:
- a ventilator stator that is able to be mounted to a structure,
- a ventilator rotor that is mounted to rotate with respect to the ventilator stator on the rotational axis when the ventilator rotor is caused to rotate by the wind, the ventilator rotor having one or more wind-drivable elements that are arranged so as to be substantially and directly exposed to the wind around a circumference of the rotor when in use,
- a clutchless motor having an axis that is co-linear with the ventilator rotational axis, the motor arranged to act as a rotating mounting between the ventilator stator and the ventilator rotor so as to support the rotation of the rotor by the wind, the motor comprising:
- a rotor that is mounted with respect to the ventilator rotor, and
- a stator that is mounted with respect to the ventilator stator.

10. A wind-driven ventilator as claimed in claim 9 wherein the motor comprises an external rotor motor having an external rotor that is mounted with respect to the ventilator rotor, and a stator that is mounted with respect to the ventilator stator.

11. A wind-driven ventilator as claimed in claim 9 wherein the motor is configured to act as an axial and thrust bearing for the ventilator rotor.

12. A wind-driven ventilator as claimed in claim 9 wherein the motor has a low rotational resistance.

13. A wind-driven ventilator as claimed in claim 9 wherein the structure to which the ventilator stator is mounted is the roof of an enclosed space of a building, or a portable structure including a shed, house or automobile.

14. A wind-driven ventilator as claimed in claim 9 wherein the one or more wind-drivable elements comprise one or more vanes or blades that is/are substantially exposed to the wind when in use.

15. A wind-driven ventilator as claimed in claim 14 wherein the ventilator rotor comprises an in-use top plate, an in-use bottom plate, and wherein each wind-drivable vane or blade extends between and is connected at respective opposing ends to the top and bottom plates.

16. A wind-driven ventilator as claimed in claim 9 wherein the ventilator stator comprises a frame for mounting to the structure.

17. A wind-driven ventilator as claimed in claim 16 wherein the frame further comprises one or more brackets that are each arranged to directly or indirectly support the motor stator.

* * * * *